United States Patent
Vicenik et al.

(10) Patent No.: US 12,542,411 B2
(45) Date of Patent: Feb. 3, 2026

(54) METHOD FOR LIMITING THE DEFLECTION OF A LASER HEAD DURING TEMPERATURE CHANGES AND A LASER HEAD

(71) Applicant: SEC TECHNOLOGIES, S.R.O., Liptovsky Mikulas (SK)

(72) Inventors: Jiri Vicenik, Liptovsky Mikulas (SK); Zina Sedlackova, Liptovsky Mikulas (SK)

(73) Assignee: SEC TECHNOLOGIES, S.R.O., Liptovsky Mikulas (SK)

(*) Notice: Subject to any disclaimer, the term of this patent is extended or adjusted under 35 U.S.C. 154(b) by 844 days.

(21) Appl. No.: 17/613,828

(22) PCT Filed: Jun. 24, 2020

(86) PCT No.: PCT/SK2020/000004
§ 371 (c)(1),
(2) Date: Nov. 23, 2021

(87) PCT Pub. No.: WO2021/002807
PCT Pub. Date: Jan. 7, 2021

(65) Prior Publication Data
US 2022/0239050 A1    Jul. 28, 2022

(30) Foreign Application Priority Data
Jul. 3, 2019  (SK) ....................... 78-2019
Jul. 3, 2019  (SK) ................... 99-2019 U

(51) Int. Cl.
*H01S 3/04*  (2006.01)
*H01S 3/03*  (2006.01)
*H01S 3/041*  (2006.01)

(52) U.S. Cl.
CPC ............ *H01S 3/0401* (2013.01); *H01S 3/041* (2013.01); *H01S 3/0305* (2013.01)

(58) Field of Classification Search
CPC ...... H01S 3/041; H01S 3/0305; H01S 3/0401; H01S 3/0404–0407
See application file for complete search history.

(56) References Cited

U.S. PATENT DOCUMENTS

| | | | | |
|---|---|---|---|---|
| RE31,279 E | * | 6/1983 | Mefferd ................. | H01S 3/086 372/107 |
| 4,715,039 A | * | 12/1987 | Miller ..................... | H01S 3/041 372/76 |
| 4,897,851 A | * | 1/1990 | Vecht ..................... | H01S 3/041 372/107 |
| 5,331,652 A | * | 7/1994 | Rapoport ............... | H01S 3/025 372/34 |

(Continued)

FOREIGN PATENT DOCUMENTS

| | | | | |
|---|---|---|---|---|
| DE | 3930328 A1 | * | 6/1990 | |
| DE | 69837632 T2 | * | 9/2007 | ............. H01S 3/042 |

(Continued)

OTHER PUBLICATIONS

International Search Report and Written Opnion for PCT/SK2020/000004, mailed on Jan. 97, 20221, 8 pages.

*Primary Examiner* — Joshua King
(74) *Attorney, Agent, or Firm* — Lee & Hayes, P.C.

(57) ABSTRACT

A method and device for limiting the deflection of a laser head during temperature changes such that a laser head is usable in applications of laser technology.

2 Claims, 2 Drawing Sheets

(56) References Cited

U.S. PATENT DOCUMENTS

| | | | | |
|---|---|---|---|---|
| 5,596,597 | A * | 1/1997 | Nishida | H01S 3/02 372/107 |
| 5,617,440 | A * | 4/1997 | Meier | H01S 3/134 372/65 |
| 5,661,746 | A * | 8/1997 | Sukhman | H01S 3/0975 372/83 |
| 5,982,803 | A * | 11/1999 | Sukhman | H01S 3/0975 372/87 |
| 6,097,745 | A * | 8/2000 | Shigematsu | H01S 3/042 372/35 |
| 6,195,379 | B1 * | 2/2001 | Jones | H01S 3/0315 372/87 |
| 6,198,758 | B1 * | 3/2001 | Broderick | H01S 3/041 372/87 |
| 7,756,182 | B2 * | 7/2010 | Newman | H01S 3/2232 372/60 |
| 9,197,028 | B2 * | 11/2015 | Bethel | H01S 3/0315 |
| 9,263,845 | B2 * | 2/2016 | Sukhman | H01S 3/03 |
| 2002/0167976 | A1 * | 11/2002 | Seguin | H01S 3/0401 372/34 |
| 2004/0179570 | A1 * | 9/2004 | Vitruk | H01S 3/0315 372/55 |
| 2005/0175054 | A1 * | 8/2005 | Shackleton | H01S 3/0315 372/87 |
| 2009/0213885 | A1 * | 8/2009 | DeMaria | H01S 3/2232 372/61 |
| 2012/0219028 | A1 * | 8/2012 | Morrow | H01S 3/0315 372/55 |
| 2014/0202998 | A1 | 7/2014 | Armbruster et al. | |
| 2015/0244137 | A1 * | 8/2015 | Sukhman | H01S 3/038 372/38.05 |
| 2015/0244139 | A1 * | 8/2015 | Sukhman | H01S 3/038 372/34 |

FOREIGN PATENT DOCUMENTS

| | | | |
|---|---|---|---|
| EP | 0163169 A2 * | 12/1985 | |
| JP | 58151079 A * | 9/1983 | H01S 3/034 |
| JP | S58151079 | 9/1983 | |
| JP | 3665039 B2 * | 6/2005 | H01S 3/03 |
| JP | 3768455 B2 * | 4/2006 | H01S 3/03 |
| JP | 2014209532 A * | 11/2014 | H03K 19/0136 |

* cited by examiner

METHOD FOR LIMITING THE DEFLECTION OF A LASER HEAD DURING TEMPERATURE CHANGES AND A LASER HEAD

RELATED APPLICATIONS

This application is a national stage application of international patent application PCT/SK2020/000004, filed Jun. 24, 2020, which claims priority to Slovakia Patent Application No. PP 78-2019, filed Jul. 3, 2019, and to Slovakia Patent Application No. PUV 99-2019, filed Jul. 3, 2019, all of which are hereby incorporated by reference in their entirety.

TECHNICAL FIELD

The invention relates to a method for limiting the deflection of a laser head during temperature changes and to the actual construction of the laser heads with a resonator firmly connected to the head body used in systems whose operating temperature can change significantly and rapidly. These temperature changes can be caused by external influences when the system with "storage" temperature must suddenly operate in an environment with a significantly different temperature, or by internal influences when the laser head is heated by waste heat during intensive laser operation. The invention falls within the field of laser technology.

BACKGROUND OF THE INVENTION

Laser heads of several laser types, e.g. "TEA" (Transversally Excited at Atmospheric pressure), are often designed so that the heat transfer between the head and the environment is significant only through a part of their surface. Such laser heads are namely often designed as blocks that have good thermal contact with the environment through only one of 6 walls of such a block. At least two walls, usually three, are namely equipped with high-voltage bushings, the other two carry elements of the optical resonator of the head, where on one wall there is a semi-transparent mirror and on the opposite wall there is a "totally" reflecting mirror. Thus, four to five walls out of six are logically excluded from significant heat transfer. The sixth wall is connected via a low thermal resistance to a cooler mediating heat exchange with the environment.

Under these circumstances, a thermal gradient develops on the head. The thermal resistance of the sixth wall of the head, which is usually the largest wall in the surface, to the environment is small. The resistance of the remaining walls is large. Since the material of the head has certain, often non-negligible, thermal expansion, it comes to deformation—to the deflection of the laser head. The described process cannot be symmetrical with respect to the resonator axis. Since the simplest and in several respects also the most advantageous design of the head uses resonator elements directly and firmly connected to the head body, it leads to the misplacement of the resonator mirrors, as they cease to be ideally parallel. The consequence of such a condition is a deterioration of the parameters, or even a failure of the laser.

In order to reduce the influence of thermal dynamics on the mechanical stability of the optical resonator of the laser, an opportunity arose to solve this problem by technical means which are able to provide more stable laser parameters. A result of this effort is a further described method for limiting the deflection of the laser head during temperature changes and a modified construction of the laser head according to the present invention.

SUMMARY OF THE INVENTION

The above stated drawbacks are largely eliminated by the method for limiting the deflection of the laser head during temperature changes and by the actual construction of the laser head according to the invention, the essence of which is that in the method for limiting the deflection of the laser head during temperature changes the temperature difference between the warmest and coldest part of the laser head is reduced by metal plate parts with high thermal conductivity attached by a thermally conductive joint to the side walls connecting the upper wall and the lower wall of the laser head. It is preferable, if metal plate parts even with a low specific weight, e.g. aluminum, are attached by a thermally conductive joint to the side walls connecting the upper wall and the lower wall of the laser head. Due to weather and/or operating conditions, it is possible that the lower wall of the laser head will be the warmest and the upper wall will be the coldest.

Laser heads of TEA lasers, i.e. gas lasers, are constructed of materials that have good vacuum properties and are also well weldable. A suitable material is e.g. stainless steel. These materials have, however, only low thermal conductivity and high specific weight. The essence of the construction of the laser head according to the present invention lies in the fact that plates of material with high thermal conductivity but also with (preferably) low specific weight (e.g. aluminum) are thermally conductively attached to the side walls of the laser head, which transfer heat between the warmest upper wall and the coldest lower wall of the head.

The advantages of the method for limiting the deflection of the laser head during temperature changes and the actual construction of the laser head according to the invention are apparent from the effects which are exerted externally. In general, it can be stated that the originality of the solution lies in the fact that with a slight increase in the weight of the head, it is possible to significantly reduce the thermal resistance between the warmest and coldest wall of the head. The result is a reduction in the temperature difference between the walls of the head, which significantly reduces the influence of thermal dynamics on the mechanical stability of the optical resonator and thus leads to more stable laser parameters.

BRIEF DESCRIPTION OF THE DRAWINGS

A method for limiting the deflection of the laser head during temperature changes and a laser head according to the present invention is illustrated in the attached drawings.

EXAMPLES OF EMBODIMENT OF THE INVENTION

Figure 1:
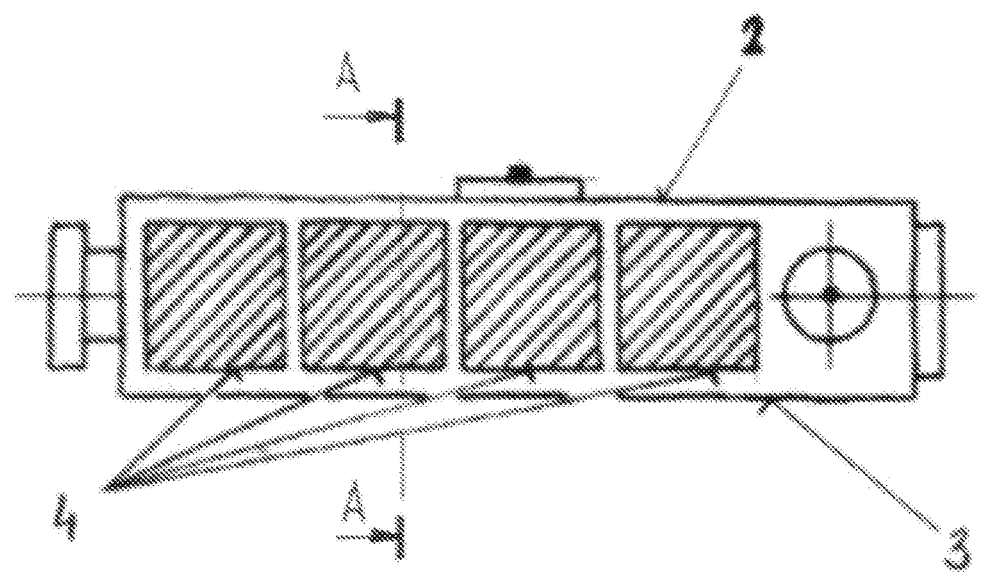
FIG. 1 shows the actual laser head in a side view and in section A-A.
Figure 1:
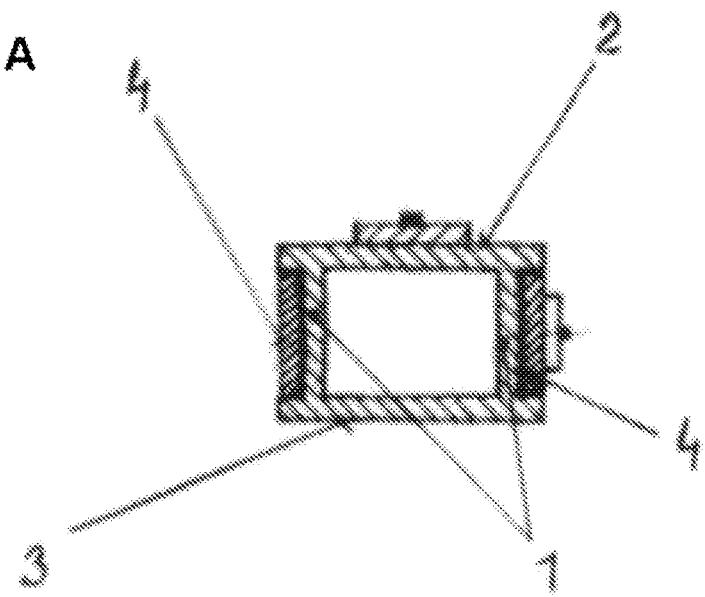

It is to be understood that the individual embodiments of the invention are presented for illustration and not as a limitation of the technical solutions. Those skilled in the art will find out or be able to ascertain by using no more than routine experimentation many equivalents to specific embodiments of the invention. Such equivalents will also fall within the scope of the claims.

It cannot be a problem for those skilled in the art to optimally design the construction and the selection of its elements; therefore these features have not been solved in detail.

Example 1

In this example of a particular embodiment of the invention, a solution of the method for limiting the deflection of the laser head during temperature changes according to the present invention is described. The method is applied to a TEA laser head of a CO2 laser in the shape of a block made of stainless steel. From FIGS. 1 and 2 it is apparent that the front wall 5 and the rear wall 6 carry resonator mirrors 7, while the HV bushing 8 of the main discharge electrodes is located on the upper wall 2. The left and right side walls 1 carry HV bushings 8 of pre-ionizers. The last lower wall 3 is smooth and heat is lead away from the head through it. The thermal gradient that deforms the head, originates between the warmest upper wall 2 and the coldest lower wall 3 and detuns the resonator as a result. This thermal gradient or temperature difference is, however, significantly limited in such a way that between the warmest upper wall 2 and the coldest lower wall 3 of the laser head, metal plate parts 4 with high thermal conductivity and low specific weight are attached by a thermally conductive joint to the side walls 1 connecting the upper wall 2 and the lower wall 3 of the laser head.

Alternatively, due to weather and/or operating conditions, it is possible that the lower wall 2 of the laser head will be the warmest and the upper wall 3 will be the coldest.

Example 2

Figure 2:
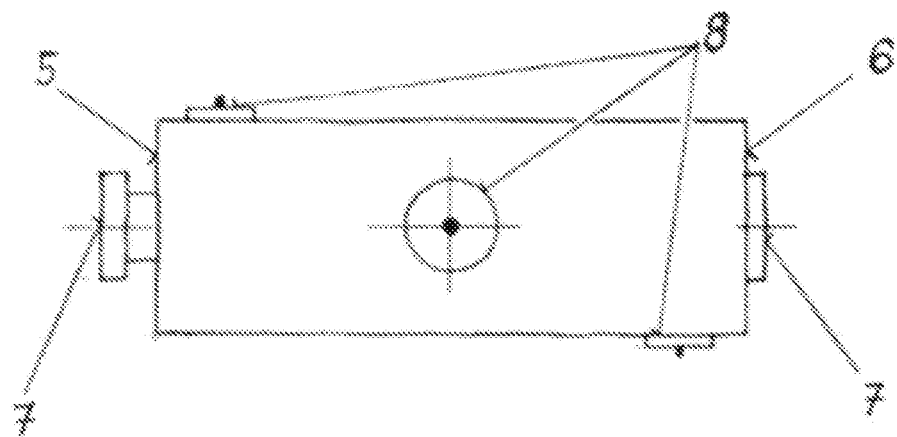
FIG. 2 shows the actual laser head in a top view and in a front view.
Figure 2:
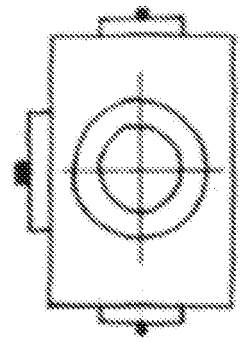

In this example of a particular embodiment of the invention, the construction of TEA head of a CO2 laser in the shape of a block made of stainless steel is described, as shown in FIGS. 1 and 2. The laser head TEA of a CO2 laser basically described in Example 1 is further solved in such a way that four metal plate parts 4 with high thermal conductivity and even with a low specific weight, what aluminum is suitable for, are attached on each side by a thermally conductive joint to the side walls 1 connecting the warmer upper wall 2 and the colder lower wall 3 of the laser head.

INDUSTRIAL USABILITY

The method for limiting the deflection of the laser head during temperature changes and a laser head is usable in applications of laser technology.

With respect to FIG. 1, the method for limiting the deflection of the laser head during temperature changes is solved in such a way that the temperature difference between the warmest upper wall and the coldest lower wall of the laser head is reduced by metal plate parts with high thermal conductivity and low specific weight attached by a thermally conductive joint to the side walls connecting the upper wall and the lower wall of the laser head.

The laser head with limited deflection during temperature changes is solved in such a way that metal plate parts (4) with high thermal conductivity and low specific weight are attached by a heat-conducting connection to the side walls (1) connecting the warmer upper wall (2) and the colder lower wall (3) of the laser head.

The invention claimed is:

1. A laser head with limited deflection during temperature changes comprising:
   an upper wall;
   side walls with bushings;
   a lower wall;
   a front wall, wherein the lower wall is constructed such that the lower wall is smoother than the front wall;
   a rear wall with elements of an optical resonator; and
   metal plate parts with low specific weight and high thermal conductivity attached by a thermally conductive joint to the side walls and connecting at least one of a warmest or a coldest upper wall and at least one of the coldest or the warmest lower wall of the laser head.

2. The laser head of claim 1, wherein the metal plate parts have low specific weight to a degree where heat is lead away from the upper wall.

\* \* \* \* \*